US009906443B1

(12) United States Patent
Singh et al.

(10) Patent No.: US 9,906,443 B1
(45) Date of Patent: Feb. 27, 2018

(54) FORWARDING TABLE UPDATES DURING LIVE PACKET STREAM PROCESSING

(71) Applicant: Amazon Technologies, Inc., Seattle, WA (US)

(72) Inventors: Bijendra Singh, Cedar Park, TX (US); Sravya Kusam, Austin, TX (US)

(73) Assignee: Amazon Technologies, Inc., Reno, NV (US)

( * ) Notice: Subject to any disclaimer, the term of this patent is extended or adjusted under 35 U.S.C. 154(b) by 136 days.

(21) Appl. No.: 15/083,207

(22) Filed: Mar. 28, 2016

(51) Int. Cl.
*H04L 12/741* (2013.01)
*H04L 12/751* (2013.01)
*H04L 12/935* (2013.01)
*H04L 12/911* (2013.01)

(52) U.S. Cl.
CPC .............. *H04L 45/54* (2013.01); *H04L 45/02* (2013.01); *H04L 47/74* (2013.01); *H04L 49/3063* (2013.01)

(58) Field of Classification Search
CPC ...................................................... H04L 45/54
See application file for complete search history.

(56) References Cited

U.S. PATENT DOCUMENTS

| 6,810,427 | B1 | 10/2004 | Cain et al. |
| 7,007,101 | B1 | 2/2006 | Schwaderer |
| 7,099,881 | B2 | 8/2006 | Richardson et al. |
| 7,274,697 | B2 | 9/2007 | Ji et al. |
| 7,630,367 | B2 | 12/2009 | Singh |
| 8,284,787 | B2 | 10/2012 | Sahni et al. |
| 8,825,937 | B2 * | 9/2014 | Atkisson ............. G06F 12/0246 711/102 |
| 2003/0229900 | A1 * | 12/2003 | Reisman ........... G06F 17/30873 725/87 |
| 2006/0026377 | A1 * | 2/2006 | Sikdar ................... H04L 45/742 711/170 |
| 2006/0168324 | A1 * | 7/2006 | Sikdar ................. G06F 12/0864 709/238 |
| 2016/0337426 | A1 * | 11/2016 | Shribman ........... H04L 65/4084 |

* cited by examiner

*Primary Examiner* — Andrew Lai
*Assistant Examiner* — Andrew C Lee
(74) *Attorney, Agent, or Firm* — Robert C. Kowert; Meyertons, Hood, Kivlin, Kowert & Goetzel, P.C.

(57) ABSTRACT

A packet processor or packet processing pipeline may implement forwarding table updates during live packet stream processing. Updates may be updates to add or remove entries from group of entries in a forwarding table or may be updates to defragment the available entries in a chain of entries maintained in a forwarding table. Reserved entries may be allocated for moving entries as part of updates so that migrations of the entries from one location to another may be performed atomically.

20 Claims, 9 Drawing Sheets

FORWARDING TABLE UPDATES DURING LIVE PACKET STREAM PROCESSING

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to increase the capacity and/or reduce the latency of processing network packets in a network. However, increasing networking device performance is not without cost. Powering devices to handle high workloads at great speed, for example, may be subject to various physical limitations, such as heat generated by power intensive networking devices, so that without certain power budgets or others limitations, networking devices may be unable to handle the workloads sustainably. Other limitations, such as chip area, may limit the amount of resources that may be applied to increase network processing capacity. Therefore, techniques that provide efficient utilization of networking device resources without sacrificing performance may be desirable.

Figure 1:
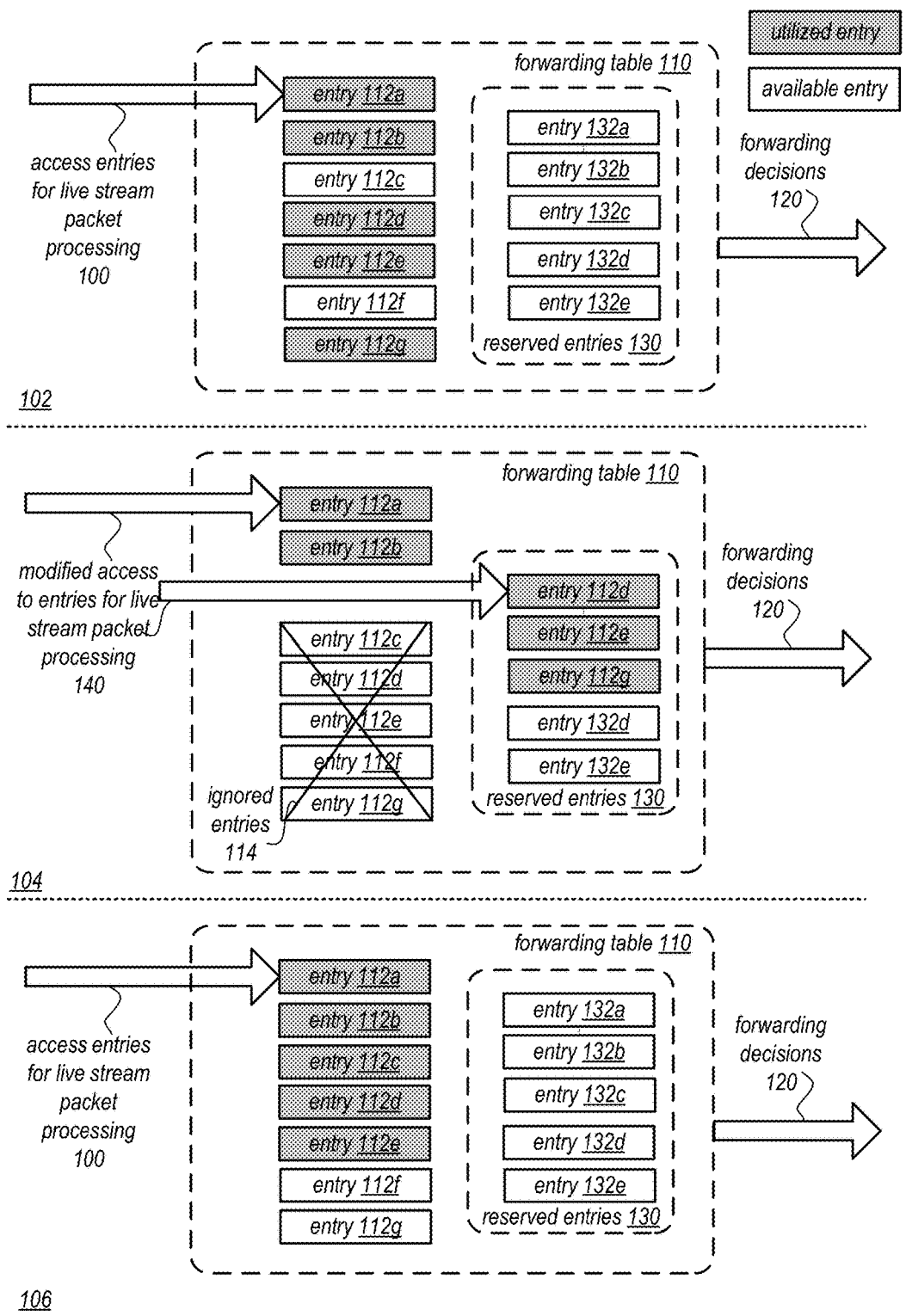
FIG. 1 is a series of logical block diagrams illustrating a forwarding table update during live packet stream processing, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement forwarding table updates during live packet stream processing. Network packets are packets of data (e.g., datagrams) sent across a network from a source networking device (e.g., a network interface card implemented at a computer or server) to a destination address representing an end networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet based on entries maintained in one or more forwarding tables. For example, packet header metadata may be evaluated in order to perform a lookup operation with respect to a forwarding table that makes a forwarding decision by identifying an interface for the network packet (e.g., a next hop address or pointer to another entry in a forwarding table in the packet processor). Once a forwarding decision is made, modifications to the packet may be performed, and the packet sent to a next networking device connected to the current networking device (or the networking packet may be dropped). Forwarding of the network packet may continue amongst the networking devices of a network until the network packet reaches the desired destination.

As forwarding tables maintain entries that describe the various interfaces and thus forwarding decisions that should be made for a network packet being processed, the content of entries may be changed in order to change the forwarding decisions made by a networking device for a subsequently processed network packet. New forwarding routes, for instance, which identify whether tunneling, multipath, or link aggregation should be utilized for a network packet and/or identify a next hop address for the network packet may be added to various forwarding tables used to make the respective forwarding decisions that result in the new forwarding route may be updated to include new information. Similarly, forwarding routes may be modified or deleted, resulting in changes to entries in one or multiple forwarding tables. Thus, updates may be performed with respect to different forwarding tables in order to facilitate new forwarding routes, modify forwarding routes, or remove forwarding routes.

Different types of updates to forwarding tables may be performed. For example, as discussed below with regard to FIGS. 7-8, some forwarding tables may store entries that are linked together in a chain of entries. In this way, some forwarding routes may be aggregated by storing small amounts of information which indicate a particular entry in the chain of entries by identifying a location of an entry relative to a point in the chain (e.g., by counting forward X entries in the chain from an entry identified by a pointer). Although entries can be added or removed in the chain of entries (as long as the logical order of entries is preserved), the results of adding or removing entries in the chain may create one or more isolated entries that become unusable for storing additional entries (which may be referred to as fragmentation). Fragmentation of available entries may prevent new entries from being stored in the chain of entries even though the chain overall has sufficient available entries because the fragmented entries do not provide a space large enough to accommodate additional entries in the appropriate portion of the chain of entries. Consider an attempt to update a forwarding table that includes 3 new entries chained together to be included in a chain of entries that only has 1 available entry at the logical location in the chain at which the 3 new entries are to be inserted. Although more than 3 entries are available to store the new entries, none are contiguously located at the logical location. Therefore, an update to the forwarding table may be performed to defragment the available entries, grouping the available entries together so that the 3 new entries can be inserted into the chain of entries.

Another type of update to a forwarding table involves updating the entries included in a group of entries in a forwarding table, as discussed below with regard to FIGS. 5-6. In some embodiments, forwarding tables may be group tables that store groups of entries together so that different evaluations (e.g., hash-based evaluations) to select or determine the appropriate entry within the group of entries may be performed. Thus, updates to group tables may be performed to add or remove entries in a group.

While updates to forwarding tables may be performed to change the forwarding of network packets, such updates may not be allowed to interfere with the processing of network packets at the packet processor. A live stream of network packets may be continually processed at the packet processor. A live stream of network packets may also be referred to as a "network flow," "traffic flow," or "packet flow" and may indicate that a packet processor is available for and/or currently receiving and processing network packets. Updates to forwarding tables may be performed while the packet processor is processing a live stream of network packets. However, updates to the forwarding table may be performed as part of a background activity at the packet processor (e.g., by opportunistically utilizing free clock cycles at different components of the packet processor to perform various update operations) without interrupting the processing of the stream of network packets through the packet processor.

As updates to forwarding tables can be performed while the packet processor is receiving and processing a live stream of network packets, the updates to forwarding tables may need to be performed atomically, such that either a previous version or an updated version of the forwarding table is available for processing a given packet, but no intermediate state of the forwarding table is available for processing the given packet. In order to provide atomic updates to forwarding tables, the effects of updates that include multiple operations to migrate or move entries (e.g., moving multiple entries to consolidate entries in a chain of entries, reducing fragmentation, or moving entries within a group of entries at a group table) may need to remain unavailable or invisible for the purposes of processing a network packet to a component or stage that accesses the forwarding table until all of the operations are complete. Thus, in various embodiments, forwarding table updates during live packet stream processing may be implemented that provide atomic updates to forwarding tables without stalling, blocking, or otherwise preventing the processing of network packets even when multiple operations are performed as part of an update.

FIG. 1 is a series of logical block diagrams illustrating a forwarding table updates during live packet stream processing, according to some embodiments. As illustrated in scene 102, forwarding table 110 maintains a plurality of entries, 112a through 112g, some of which are utilized (112a, 112b, 112d, 112e, and 112g) and some of which are not utilized (112c and 112f). Access 100 to entries 112 for live stream packet processing may be provided so that the appropriate forwarding decisions are made. For instance, an entry 112d may be accessed in order to identify next hop address for a network packet. In order to perform an update operation, such as a defragment operation or other operation that moves multiple entries in forwarding table 110, a set of entries may be previously allocated for performing updates to forwarding table 110 (reserved entries 130 in FIG. 1). For example, additional bytes, blocks, or other units of storage may be allocated from a logical end of memory device(s) maintaining forwarding table 110. In some embodiments, reserved entries 130 may be maintained in a different memory component altogether from forwarding table 110 (as discussed below with regard to FIGS. 5 and 6).

Consider an update to forwarding table 110 that defragments the available entries 112c and 112f In order to ensure that an intermediate version of the entries which may be modified to defragment these entries (e.g., entries 112c through 112g), the contents of entries 112d, 112e and 112g may be copied to entries 132 in reserved entries 130, as illustrated in scene 104. Note that the ordering of entries may be preserved (112d→112e→112g) in reserved entries. Once the operations to copy the entries to reserved entries 130 are complete, access to entries may be modified 140, so that access can be made to entries 112a and 112b and entries 112d, 112e, and 112g in reserved entries 130. For example, a pointer that identifies the entries to be moved, entries 112d, 112e, and 112g, may be changed to point to reserved entries 130 to reflect the new location of these entries in reserved entries 130. In this way, entries 112c-112g may be ignored for packet processing purposes because when the content of entries 112d, 112e, and 112g needs to be accessed in order to process a network packet, the pointer would direct processing of the packet to use the copied contents of 112d, 112e, and 112g that is stored in reserved entries 130.

During the time in which entries 112c through 112g are ignored, operations to copy the interfaces from entries, 112d, 112e, and 112g may be performed so that available entries are grouped together, as illustrated in scene 106. Once the operations are complete, the access to entries may be modified again to provide access that just utilizes the entries in forwarding table 110 (without accessing reserved entries 130).

Please note that the previous description of forwarding table updates during live packet stream processing is not intended to be limiting but is provided as a logical example of increased entropy. The organization of components, entries, and other depicted items may be different than those illustrated in FIG. 1.

This specification begins with a general description of a networking device, which may utilize forwarding table updates during live packet stream processing at a packet processor. Then various examples of a packet processor are discussed, including different components/modules, or arrangements of components/modules that may be implemented that utilize and update forwarding tables. A number of different methods and techniques to implement forwarding table updates during live packet stream processing are then discussed, some of which are illustrated in accompanying flowcharts. Various examples are provided throughout the specification.

Figure 2:
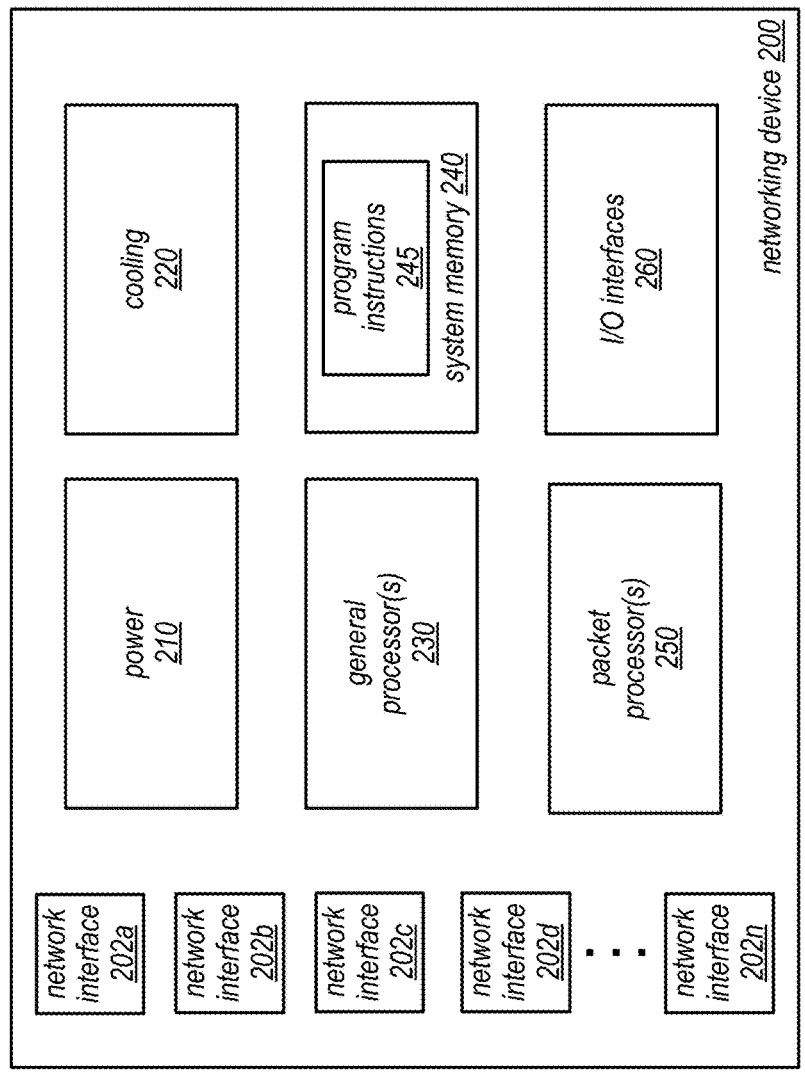
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, action tables, insert or remove forwarding routes, etc.) according to the techniques discussed below with regard to FIGS. 5-7 in order to perform forwarding table updates during live packet stream processing. Additionally, a controller may be able to access network packets trapped or logged by a packet processor 250 for further analysis and direct processing actions to be performed by packet processor 250 for the network packet.

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
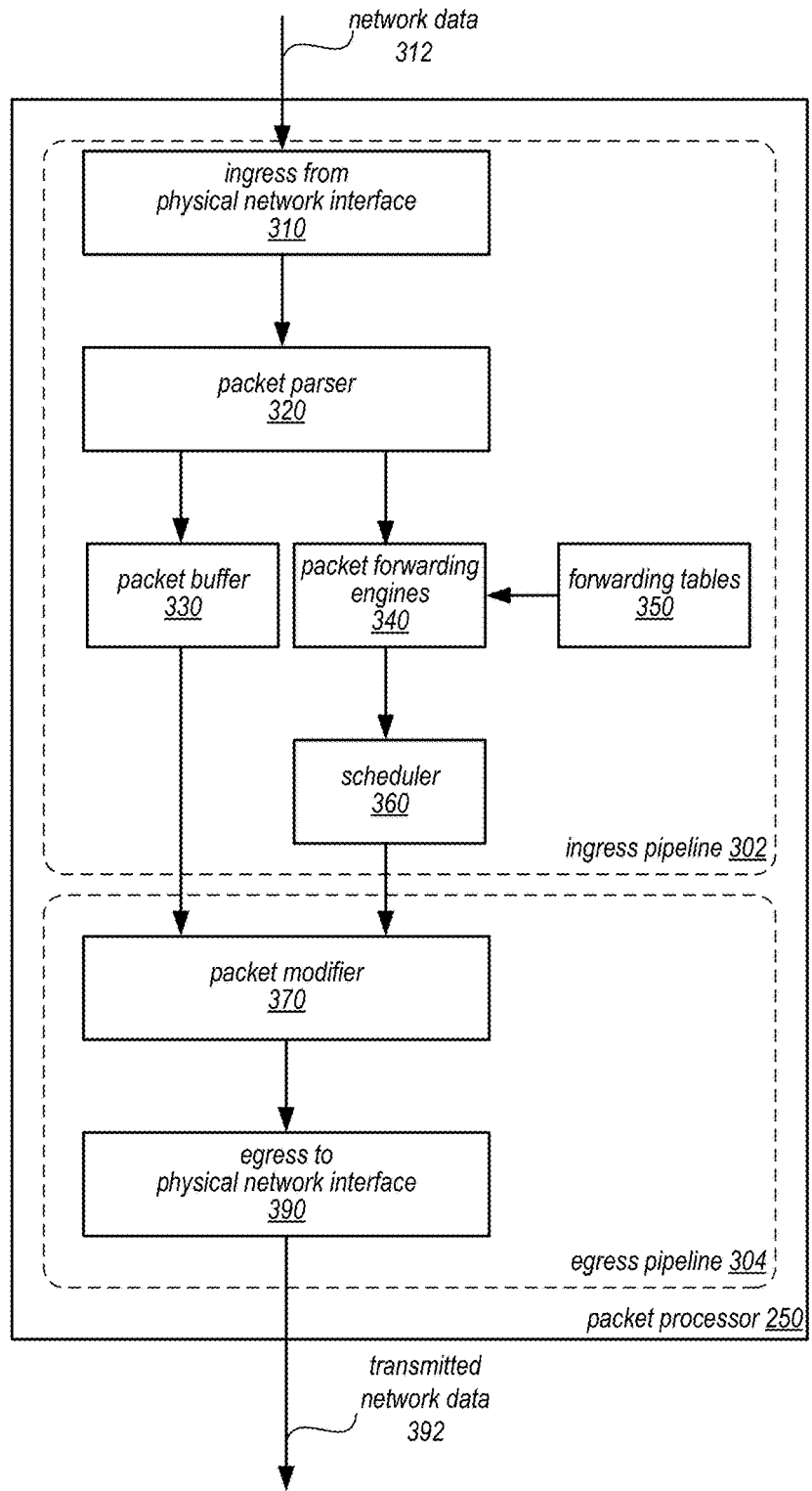
FIG. 3 is a logical block diagram illustrating a packet processor that performs forwarding table updates while processing network packets, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), or other dedicated circuitry that performs packet processing, such as a System on a Chip (SoC). Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that performs network packet tracing, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340.

Packet forwarding engines 340 may access data stored in forwarding tables 350 to make forwarding and tunneling decisions for the network packet based on information in the packet header (e.g., packet metadata) extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port. If the MAC address is known but attached to a different port than indicated in the MAC address table, then an operation may be performed to move the source MAC address to the port. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in layer 3 (L3) portions of the packet to perform L3 forwarding. For example, internet protocol (IP) headers for the packet may be evaluated with respect to entries in tables, such as a routing or next hop table, to determine forwarding to be performed. Please note that the previous examples of packet forwarding engines 340 is not exhaustive, as many other forwarding decisions may be made, including, but not limited to, forwarding engines for spanning tree protocol (STP) state checking, access port virtual LAN (VLAN) handling, VLAN membership checking, MAC2ME lookup, broadcast/multicast forwarding to a host CPU for the switch (e.g., CPU(s) 230), tunnel start/termination lookup, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, forwarding tables 350 may be implemented in one or multiple storage devices, such as various memory devices (e.g., a CAM, such as a TCAM, and/or random access memory) to store table data for performing different routing decisions. Tables may include a VLAN table, MAC address table, routing table, adjacency table, next hop table, tunnel start table, tunnel termination table, and/or actions table or various other tables, such as those group or pointer tables illustrated and discussed below with regard to FIG. 4. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

Figure 4:
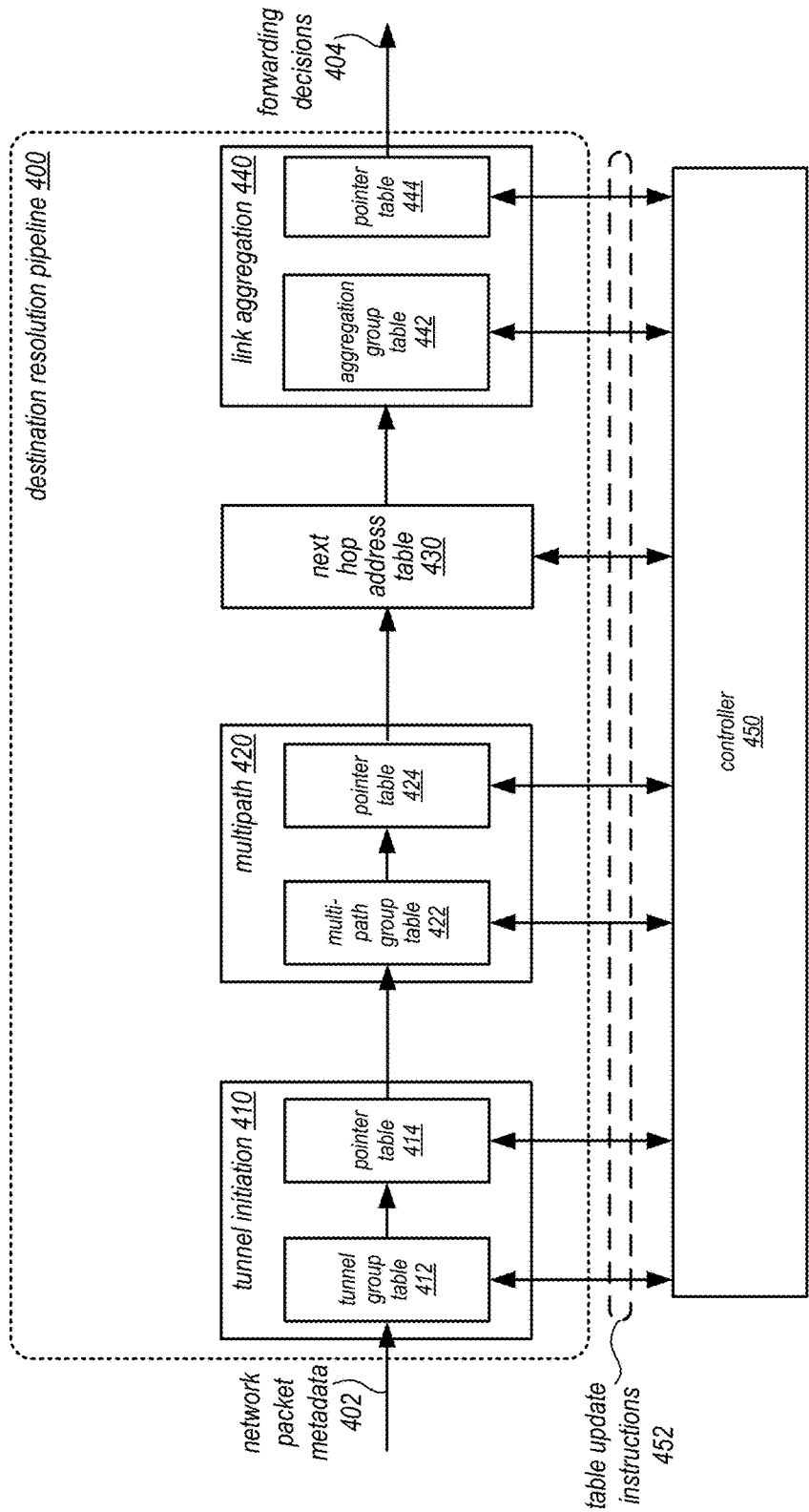
FIG. 4 is a logical block diagram illustrating destination resolution stages utilizing forwarding tables that may be updated during live packet processing at the destination resolution stages, according to some embodiments.

FIG. 4 is a logical block diagram illustrating destination resolution stages utilizing forwarding tables that may be updated during live packet processing at the destination resolution stages, according to some embodiments. Destination resolution pipeline 400 may implement multiple different destination resolution stages, such as tunnel initiation stage 410, multipath stage 420, next hop address stage 430, and link aggregation stage 430. When network packet metadata 402 is received, different destination resolution stages may be selected based on accessing an entry in a pointer table at prior stages (either in destination resolution pipeline 400 or a prior stage in packet processing pipeline 302 (e.g., another forwarding engine)), evaluating the pointer type of the pointer to identify a next destination resolution stage corresponding to the pointer type, and performing a lookup operation according to the pointer retrieved from the entry at the prior stage. Some destination resolution stages, such as tunnel initiation stage 410, multipath stage 420, and link aggregation stage 440 may have multiple possible forwarding paths (possible forwarding paths 416, 426 and 466 respectively) via which a network packet may be forwarded based on a previous forwarding decision (e.g., a value in an pointer table entry for a prior stage).

In at least some embodiments, destination resolution pipeline 400 may implement tunnel initiation stage 410. Tunnel initiation stage 410 may lookup tunnel initiation data to start or initiate tunneling for a network packet. A prior stage, such as an L2, L3, or ingress access control list forwarding engine may retrieve a pointer that has tunneling pointer type. The tunneling pointer type may indicate that the pointer is a pointer into tunnel group table 412. Some destination resolution stages may utilize a group table and a pointer table in order to manage the distribution of selecting entries in the pointer tables. For example, groups within a group table may include different entries which may map to another entry in a pointer table. Load balancing utilizing a hash value may be performed with respect to the different elements within a group.

Figure 5:
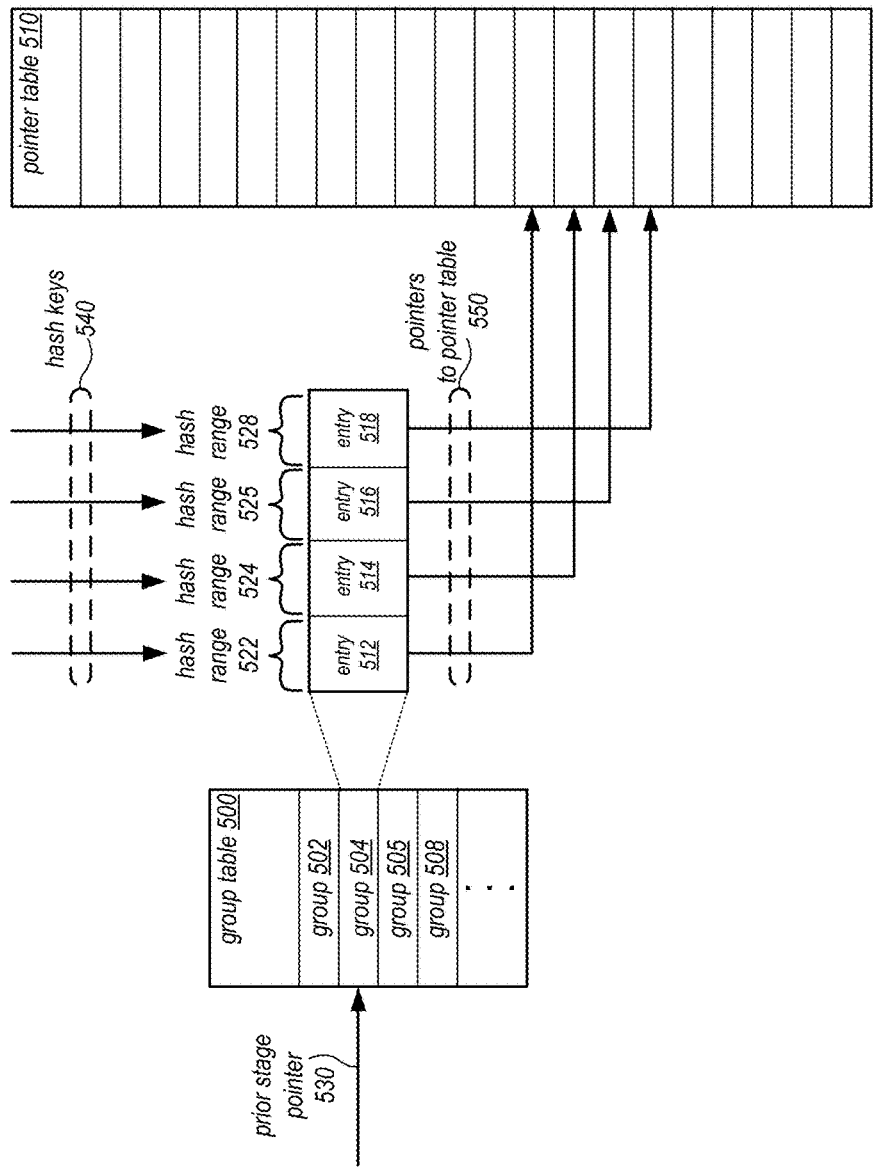
FIG. 5 is a logical block diagram illustrating an example of utilizing group entries in a forwarding table, according to some embodiments.

For example, FIG. 5 is a logical block diagram illustrating utilizing a hash value generated according to a load balancing scheme or a programmatically identified value, according to some embodiments. A group table 500, such as tunnel group table 512 and pointer table 514 may be utilized to perform load balancing. As illustrated in FIG. 5, Group table 500 may be composed of different groups, such as groups 502, 504, 506, 508, and so on. Each group includes different elements. For example, group 504 is illustrated as including entries 512, 514, 516, and 518. Hash ranges may be assigned to the different entries of a group, such as hash range 522 assigned to entry 512, hash range 524 assigned to entry 514, hash range 526 assigned to entry 516, and hash range 528 assigned to entry 518. The assignment of hash ranges to different entries for a group may be programmed or reprogrammed by a controller or other component that may access memory maintaining group table 500. For example larger numbers of network packets may be directed to a pointer entry in pointer table 510 by assigning a greater hash value range to a particular member (e.g., entry 514) that maps to the particular pointer. In this way, traffic may be distributed across members in a group (and thus pointers in a pointer table) according to an equal cost (e.g., equal hash ranges) or weighted cost distribution scheme (e.g., different size hash ranges), in some embodiments. For example, different amounts of network traffic may be allocated to different tunnels by directing traffic to different entries that point to tunnel pointers which describe different tunnels (e.g., 20% traffic directed to a particular pointer table pointer may be implemented by assigning 20% of the total hash space to entry 512, 40% traffic may be directed to a second pointer mapped to entry 514 by setting a hash range equivalent to 40% of the hash space, 25% of traffic may be directed to a third pointer mapped to entry 516 equivalent to 25% of the hash space, and 15% of traffic directed to a fourth pointer mapped to entry 518 which may be 15% of the hash space).

Table groups may be identified by the prior stage pointer 530, which points to one of the groups (e.g., group 504). Group 504 includes entries (512, 514, 516, or 518) for the identified group. To select from among the multiple entries, a hash key value 540 is utilized. The hash key value may 540 be a hash value generated by parser 320 or some other packet processing stage prior to tunnel initiation 510 based on different fields accessed in the network packet and/or other metadata in the network packet. The hash key value 540 may fall within a range assigned to one of the entries (e.g., hash range 524 assigned to entry 514). A pointer 550 to pointer table 510 may be determined by the identified entry and group 504 in order to read the identified pointer.

Turning back to FIG. 4, once the appropriate entry for pointer table 414 in tunnel initiation 410 is identified, the contents of the entry may be read and evaluated. An entry in pointer table 414 may include (but is not limited to), an indication as to whether the tunnel entry is valid, tunnel initiation data (e.g., a tunnel header index, which points to a location in another memory or storage device to retrieve a copy of a tunnel header which is used to encapsulate the network packet in order to apply tunneling, and a tunnel header size, which indicates the size of the tunnel header, or any other description of tunnel header data to encapsulate the packet, which may be applied at packet modifier 370), a pointer to another destination resolution stage, and/or a pointer type for the pointer. For example, the entry may include a pointer identified as a next hop address pointer so that the next destination resolution stage to process the network packet is next hop address stage 430.

Destination resolution pipeline 400 may implement a multipath destination resolution stage 420, in some embodiments. Multipath destination resolution stage 420 may provide weighted cost multipath (WCMP) or equal cost multipath (ECMP) to distribute network traffic amongst multiple valid paths in a network. Paths may be selected based on a hash of the network traffic flow. Moreover, allocations of network traffic can be weighted per network traffic flow. Note that weighting may not be based on bandwidth, in some embodiments. Similar to tunnel initiation stage 410, multipath stage 420 may implement multipath group table 422 and pointer table 424. In this way, the group entries (as discussed above with regard to FIG. 5) may be programmed to direct network traffic to valid paths according to the weighting of the network traffic flows assigned to each group entry in pointer table 424 for a group in multipath group table 422. Group entries in pointer table 424 may include information to direct network traffic according to the corresponding valid path, a pointer, and type of pointer, in some embodiments. The type of pointer may indicate which one of the subsequent destination resolution stages, such as link aggregation 440 (or other destination resolution stages not illustrated), may process the network packet.

Although not illustrated in FIG. 4, destination resolution pipeline 400 may implement a multiprotocol label switching (MPLS) outer label stage, in some embodiments. As noted above, different types of network packets (e.g., L2, L3, or MPLS) may be processed at destination resolution pipeline 400. The MPLS outer label stage may provide new MPLS labels as needed for some network packets being tunneled in MPLS or MPLS packets.

Destination resolution pipeline 400 may implement next hop address stage 430, in some embodiments. Next hop address stage 430 may provide entries describing a next hop address (which may be a directly connected host to the networking device or an indirectly connected subnet) for different network packets corresponding to various forwarding routes (e.g., as may be pointed to by an L3 or MPLS forwarding engine or by an access control list rule) or other destination resolution stage (e.g., tunnel initiation stage 410, multipath stage 420, and/or the MPLS outer label stage 430. If a pointer does not point to a valid entry in next hop address stage 430, then the network packet may be trapped, forwarded, or logged for the controller to process. Entries in next hop address stage 430 may include an indication as to whether the entry is valid, an entry for address resolution protocol (ARP), a destination MAC address index, an indication as to whether an egress virtual local area network (VLAN) is valid, an egress VLAN, an egress logical port indication, an indication of the maximum transmission unit (MTU), and an indication as to whether the network packet should be mirrored. In some embodiments, entries may also include tunnel information (which may supersede tunnel information in tunnel initiation stage 410), such as an indication as to whether tunneling is enabled for the network packet, an index or location of a tunnel header to insert to enable tunneling, and a tunnel header size.

Although not illustrated in FIG. 4, destination resolution pipeline 400 may implement a fast re-route stage, in some embodiments, after next hop address stage 430 The fast re-route stage may provide a quick substitution of a back-up link when a link goes down. For MPLS packets, if fast re-route is enabled for the logical port selected in the next hop address stage 430. The packet may be encapsulated with a fast re-route label (e.g., by packet modifier 370) and provided with an alternate egress port and DMAC address. Fast re-route label insertion may be enabled and disabled per port (logical or physical) with control registers that indicate whether the port has fast re-route enabled or disabled (i.e. whether the port is down or up). A controller may set the fast re-route label, alternate egress and DMAC address in the fast re-route in advance as back up routes and then enable them with a single change to the control register for the particular port that has gone down, so that MPLS packets that were meant to egress on that particular port will use the backup route.

Destination resolution pipeline 400 may implement link aggregation stage 440, in some embodiments. Link aggregation stage 440 may enable sharing of bandwidth across multiple ports. To enable this feature, link aggregation stage 440 is implemented much like tunnel initiation stage 410 and multipath stage 420, utilizing aggregation group table 442 to select group entries in pointer table 444. A particular group entry in 444 may be determined according to a hash value generated for link aggregation stage 440, which may be different than the hash key values generated for tunnel initiation stage 410 and multipath stage 420. In some embodiments, link aggregation stage 440 provides an even distribution of traffic across group entries for a group in pointer table 444. However, weighted distribution is possible and may be programmed by the controller.

As noted above different types of network packets may be processed in a destination resolution pipeline that selectively determines destination resolution stages to determine a forwarding decision for the network packet. When forwarding a network packet according to an Internet Protocol address, according to some embodiments, only some of the illustrated or discussed stages in FIG. 4 may be utilized. For instance, many different pipeline configurations may be utilized for IP type of network packet. IP on IP tunneling may be applied, with or without directing the network packet along one of many valid paths using weighted or equal cost multipath, and link aggregation may be provided (if the next hop address is a logical interface). In another example, an MPLS tunnel could be enabled for the network packet so in addition to the illustrated stages in FIG. 4, an MPLS outer label switching stage and/or fast re-route stage could be utilized (e.g., to push one or two MPLS labels in order initiate one or two MPLS tunnel encapsulations for the network packet). Thus, the illustrated examples are not intended to be limiting as to the various configurations of a destination resolution pipeline for an IP packet. Similarly, various different configurations of destination resolution stages may be utilized for MPLS or L2 packet types.

Also illustrated in FIG. 4, is controller 450. Controller 450 may be implemented by one or more general purpose processors, such as general processor(s) 230, executing program instructions to implement a controller for a packet processor. In order to update the various forwarding tables for the different stages in destination resolution pipeline 400, controller 450 may be configured to send various table update instructions 452 to perform the update techniques discussed below with regard to FIGS. 6, and 8-9. In some embodiments, table update instructions 452 may be specific directions or operations to copy entries from location in a table to another entry, modify pointer values, enable or disable control registers or bits, or any other action to perform updates to forwarding tables. In some embodiments, controller 450 may send a single update instruction which can include entries to migrate, destination entries to receive the entries, entries to add, entries to move, or any other information for performing updates. Destination resolution pipeline 452 may receive the instructions and carry out the various operations to perform the techniques discussed below using dedicated circuitry executing microcode (e.g., operations to copy entries from location in a table to another entry, modify pointer values, or enable or disable control registers or bits).

Destination resolution pipeline may utilize different types of forwarding. For example, group tables, such as tunnel group table 412, multi-path group table 422, and aggregation ungroup table 442, may be updated in order to modify forwarding routes or decisions. FIG. 6 is a series of logical block diagrams illustrating group entry modifications as part of an update to a forwarding table performed during live packet processing, according to some embodiments. In scene 602a, group table 600 is illustrated as implementing group 610, which contains entries 612a, 612b, 612c, 612d, and 612e. In order to facilitate update operations, reserved group 620 containing entries 622a, 622b, 622c, 622d, and 622e is allocated for update operations. In at least some embodiments, groups within a group table are a fixed number of entries (e.g., 5 entries), whether or not each entry is utilized (e.g., some groups may only utilize 3 of the 5 entries). Thus, new entries may not be added to a group in excess of the fixed size. Moreover, the reserved group may be the same size as the fixed size of groups in the group so that a current state of a group may be preserved in a reserved group while an update to the group is being performed. Group pointer 630 (e.g., prior stage pointer 530 in FIG. 5) may identify group 610 for processing network packets.

In scene 602b, an update operation is begun for group 610. The current state of group 610 is copied to reserved group 620. For example, atomic operations to read and write the contents of entry 612a to 622a, 612b to 622b, and so on, may be performed (as illustrated by the arrow indications). Once the entries are moved to the entries in reserved group 620, as illustrated in scene 602c, the group pointer may be modified 640 to point to the reserved group (so that when processing network packets that utilize group 610, the current state of group 610 preserved in the entries 622 of reserved group 620 may continue to be used while operations to update group 610 are performed. For example, in scene 602d, the contents of 1 entry, entry 612a are deleted, removing an entry from group 610. The remaining entries may be shifted left, as illustrated in scene 602e, in order to finalize the updated version of group 610.

Once update operations are completed, then a single operation, an atomic write operation to modify group pointer 630 to point back to group 610 may be performed, as illustrated in scene 602*f*. In this way, network packet processing will be unable to access an intermediate version of group 610 (e.g., with some update operations completed and some update operations not completed).

Figure 6:
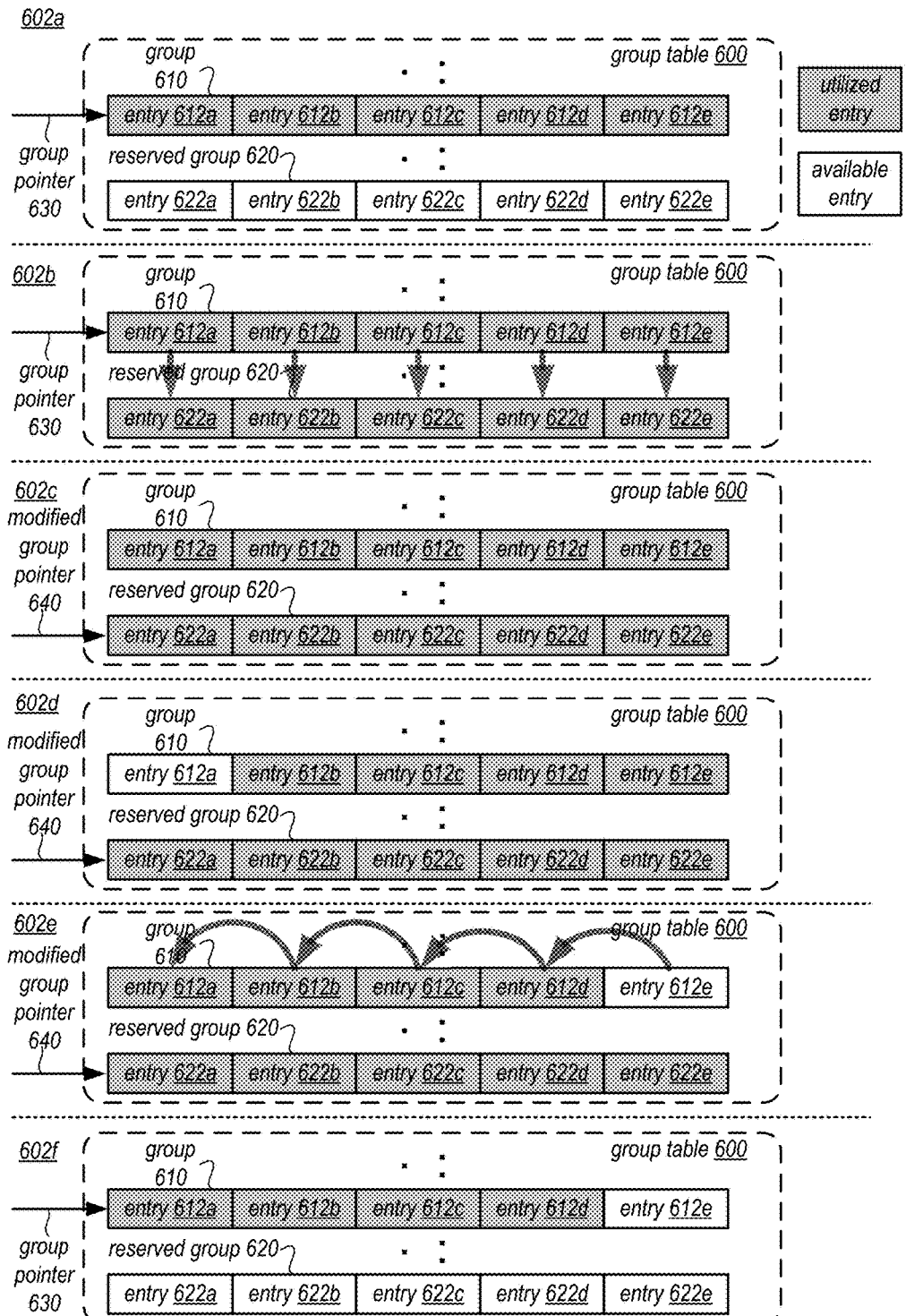
FIG. 6 is a series of logical block diagrams illustrating group entry modifications as part of an update to a forwarding table performed during live packet processing, according to some embodiments.

Although in FIG. 6, reserved entries are illustrated in a reserved group implemented as part of group table 600, in some embodiments, a separate memory component or device different than the memory component or device maintaining group table 600 may be utilized to implement reserved entry group 620. Consider a memory component that is accessed in parallel with group table 600. The memory component may include a control register that stores a pointer value and a valid bit and storage that maintains reserved entry group 620. If an update operation is being performed, the contents of the entries of a group (e.g., group 610) may be copied from the other component hosting group table 600 to the group 620, similar to the illustration in scene 602*b*. In order to switch utilization from group 620 to the other group, a pointer value for group 620 may be stored in the control register and the valid bit set (e.g., to a value of "1") indicating that the reserved group 620 is used for processing packets in place of group 610 in group table 600. Thus when a lookup is performed according to the pointer to group 610, both the contents of group 610 entries and group 620 entries may be accessed. However, if the valid bit is set, then the contents of group 610 entries are ignored. To switch the group pointer back to utilizing group 610, an operation to clear the valid bit (e.g., set the value to "0") may be performed. In this way, single atomic operations to set the valid bit or to clear the valid bit may be performed so that an intermediate state of group 610 is not made available for processing network packets.

Figure 7:
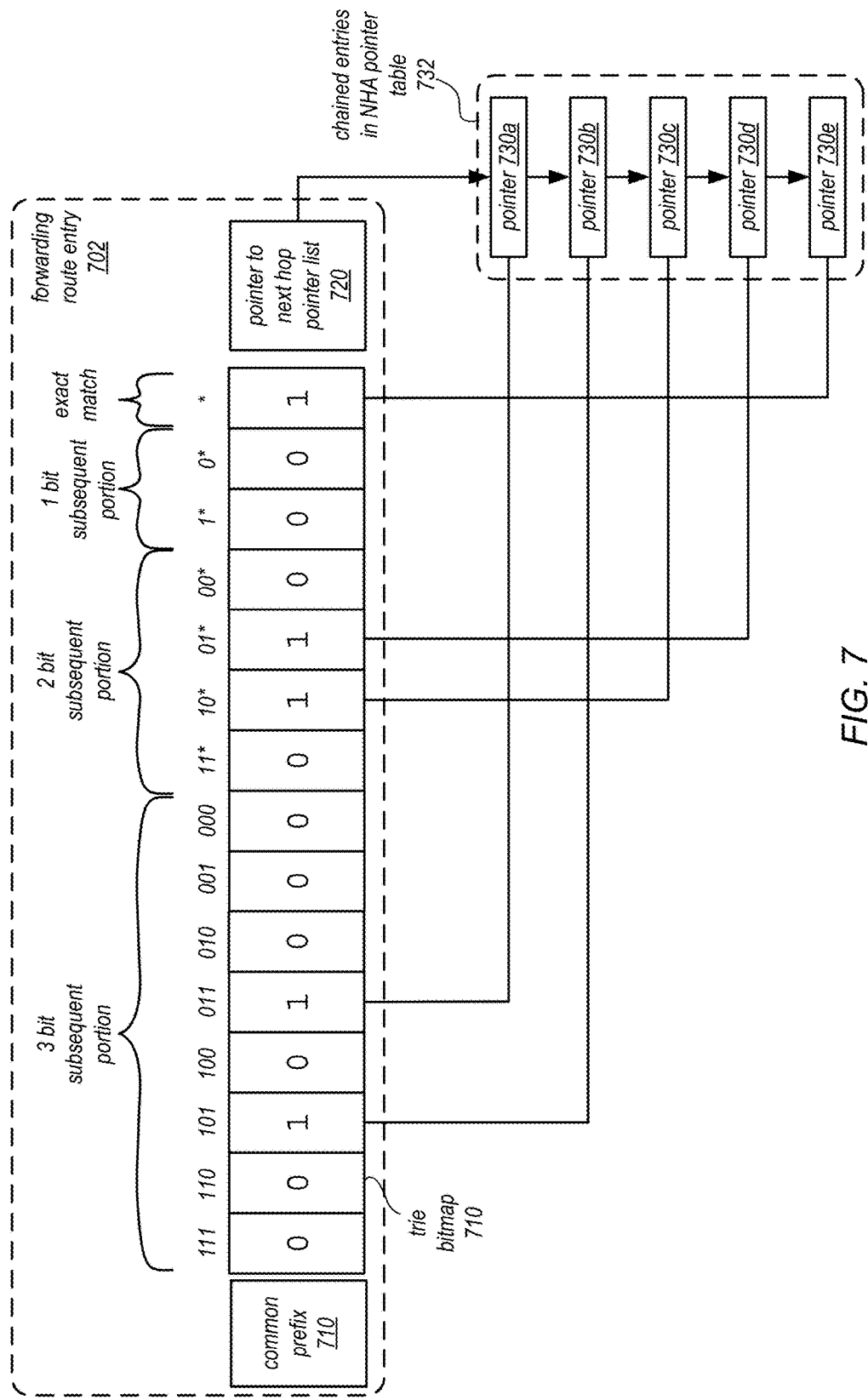
FIG. 7 is a logical block diagram illustrating an example route aggregation map that utilizes chained entries in a forwarding table, according to some embodiments.

In addition to group tables, some forwarding tables may utilize chained entries to determine a particular entry for processing a network packet. FIG. 7 is a logical block diagram illustrating an example route aggregation map that utilizes chained entries in a forwarding table, according to some embodiments. For example, a forwarding engine, such as an L3 forwarding engine may store routing tables that aggregate different forwarding routes together in a single entry, such as forwarding route entry 702. In order to aggregate forwarding routes, a shared or common route prefix 710 may be stored, along with an aggregation map or structure that describes multiple forwarding routes that share the common prefix and identifies the different next hop address pointer entries associated with the different forwarding routes in the entry. In some embodiments, a trie bitmap, such as trie bitmap 710 may be implemented, which describes the remaining the portion of the forwarding routes subsequent to the common portion by indicating the value of the remaining bits in the forwarding route based on the location of a bit in the bitmap. Then the corresponding pointer to a next hop address can be determined for a route by counting forward in a chain of pointer entries 732 from a base pointer entry, such as pointer to next hop pointer list 720. The number of entries to count forward from the base pointer can be determined by the relative position of the set bit indicating the matching route with respect to other set bits in the trie bitmap.

For example, as illustrated in FIG. 7 trie bitmap 710 describes different subsequent portions that could be appended to common prefix 710. For instance, common prefix may be 29 bits of a 32 bit IPv4 address, and the possible combinations of the three remaining bits may be represented by different bit values trie bitmap 720. For instance, the bit is set for value "101" indicating that a forwarding route is stored that has the common prefix 710 plus the remaining three bits set to "101." In addition to 3 bit subsequent combinations, 2 bit combinations, 1 bit portion, or an exact matching portion (e.g., a forwarding route that is exactly 29 bits) may be indicated by respective bits set in trie bitmap 710. As noted above, the pointer values corresponding to the forwarding routes described by the set bits are logically linked together according to the order in which the bits in the bitmap are set. For instance, pointer 730*a* corresponds to the first bitmap 710 value set (for subsequent portion "101"), 730*b* corresponds to the second bitmap 710 value set (for subsequent portion "011"), and so on. In this way, the appropriate pointer value for a forwarding route may be described by counting forwarding from the base pointer 720 to the corresponding pointer 730.

Figure 8:
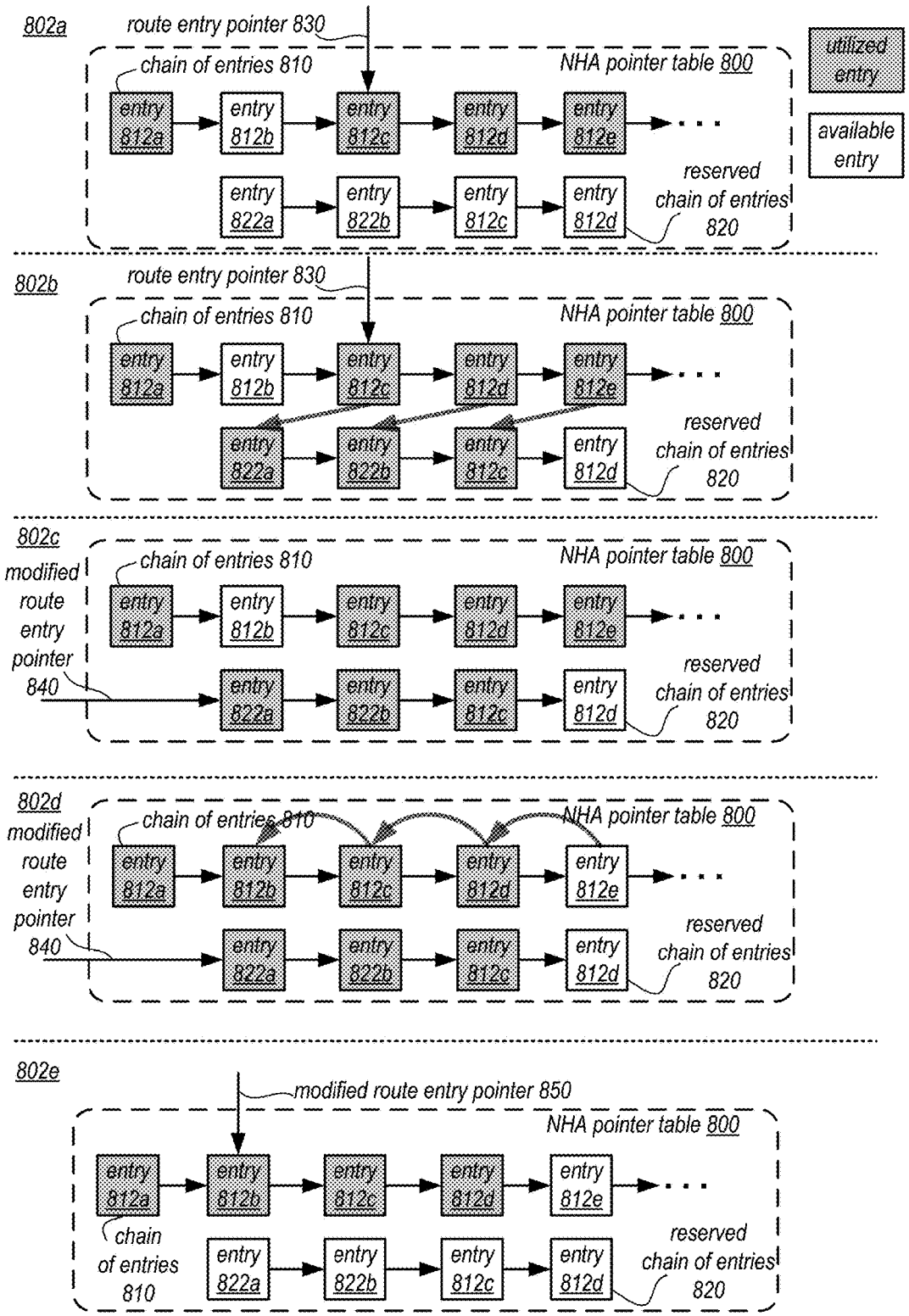
FIG. 8 is a series of logical block diagrams illustrating available entry defragmentation of chained entries as part of an update to a forwarding table performed during live packet processing, according to some embodiments.

In order to be able to dynamically add or remove forwarding routes from an entry, updates may be performed to remove or insert pointers into the chain of entries 732. Over time, changes to the chain of entries result in fragmentation if insufficient space in the chain of entries remains to insert new entries into the correct location (e.g., so that the entries are mapped to the appropriate bit in a trie bitmap). FIG. 8 is a series of logical block diagrams illustrating available entry defragmentation of chained entries as part of an update to a forwarding table performed during live packet processing, according to some embodiments.

As illustrated in scene 802*a*, NHA pointer table 800 may utilize chain of entries 810 to store pointers to next hop addresses in entries 812*a*, 812*c*, 812*d*, and 812*e* for matching forwarding routes in a routing table. A route entry pointer 830, may point to an entry in the chain (e.g., entry 812*c*) as a base pointer or other starting point for discovering the appropriate entry for a forwarding route (e.g., as discussed above with regard to FIG. 7). NHA pointer table 800 may also include a reserved chain of entries 820 to perform update operations. The length or number of entries in the reserved chain of entries may match a maximum chain length (e.g., up to 8 entries may be linked together for a single forwarding route entry) so that the state of a chain of entries may be preserved for processing network packets while update operations are being performed on the entries in chain of entries 810.

For example, as illustrated in scene 810, operations to defragment chain of entries 810 by consolidating available entries, may be performed by copying the contents of entries 812*c*, 812*d*, and 812*e* to respective locations in reserved chain of entries 820 that preserve the ordering of the entries (e.g., 812*c* to 822*a*, 812*d* to 822*b*, and 812*e* to 822*c*). Once the operations to copy the entries to a substitute chain of entries is complete, the route entry pointer may be modified 840 to point to entry 822*a* in reserved chain of entries 820, as illustrated in scene 802, (e.g., by changing the base pointer in the forwarding route entry to point to entry 822*a* as the base pointer). In this way, when network packets match a forwarding route in the forwarding route entry, the modified route entry pointer 840 will access reserved chain of entries 820 to determine a next hop address pointer for a matching forwarding route.

While network packets are being processed utilizing the reserved chain of entries 820, update operations may be performed to consolidate utilized entries so that available entries are logically contiguous with other available entries. For instance, as illustrated in scene 802*d*, contents of entries 812*c*, 812*d*, and 812*e* are shifted so that no fragmentation exists between entry 812*a* and 812*b*. Entry 812*e* may then be contiguous with other entries (not illustrated) that are available for storing chained entries. As indicated in scene 802e, upon completion of the operations to update the chain of entries 810, the route entry pointer may be modified again 850 to point to the new location for the base pointer, entry 812b.

Similar to the example given above with regard to group tables, reserved entries for updating a chain of entries may be maintained in a separate memory device or component that includes a control register and storage for the reserved entries. To switch utilization to the reserved entries, a valid bit is set for the control register to indicate that the entry identified in the control register (e.g., the base pointer to the chain of entries) is preserved in the reserved chain of entries and that when accessed in parallel with chain of entries 810, the results from chain of entries 810 may be ignored until the bit value is cleared.

In at least some embodiments, virtual routing may be implemented so that different versions of a routing table are implemented for forwarding network packets. In such scenarios, a separate chain of entries may be maintained for each virtual routing table, along with a respective chain of reserved entries for each virtual routing table.

The examples of forwarding table updates during live packet stream processing as discussed above with regard to FIGS. 2-8 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may access, rely upon, or implement the increase of entropy across routing table segments. In addition to examples given above, the techniques discussed below with regard to FIG. 9 may be also implemented using the various components discussed above as well as different types of systems or devices that perform packet processing.

Figure 9:
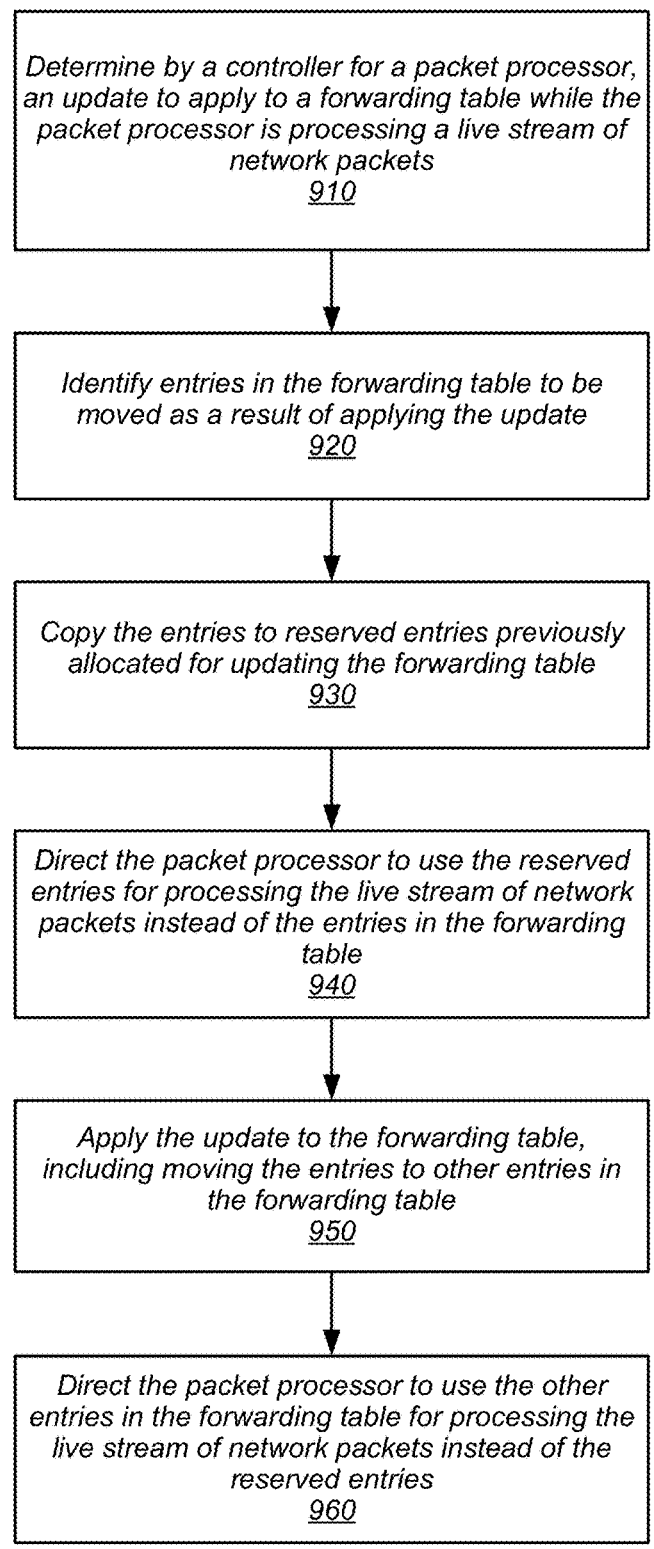
FIG. 9 is a high-level flowchart illustrating various methods and techniques to performing forwarding table updates during live packet stream processing, according to some embodiments.

FIG. 9 is a high-level flowchart illustrating various methods and techniques to performing forwarding table updates during live packet stream processing, according to some embodiments. As indicated at 910, a controller for a packet processor may determine an update to apply to a forwarding table while the packet processor is processing a live stream of network packets. For example, various events may be detected that trigger different respective forwarding table updates. Consider an event that detects when fragmentation in a chain of entries exceeds a threshold percentage (e.g., 30% of available entries are fragmented). In response to detecting a fragmentation event, the controller may determine updates to consolidate available entries to reduce fragmentation. In some embodiments, an event to defragment a chain of entries may be triggered when an attempt to insert a forwarding route is denied for lack of availability to store the next hop address pointers because no contiguous set of entries exists. Events may be triggered by requests to add or remove entries from group tables, in some embodiments.

As indicated at 920, entries in the forwarding table to be moved as a result of applying the update may be identified. For example, portions of chains of entries adjacent to available entries may be located. Entries may also be identified if associated with a particular group (e.g., entries located in group with an entry to be added or removed). As indicated at 930, copies of the identified entries to reserved entries previously allocated for updating the forwarding table may be performed. Once copying of identified entries to the reserved entries is complete, the packet processor may be directed to use the reserved entries for processing the live stream of network packets instead of the entries in the forwarding table. For example, one or more pointer values may be modified, control registers set, or any other indication or technique to switch access or utilization from the entries to the reserved entries may be performed. As indicated at 950, the update to the identified entries may be applied (e.g., by adding, removing, and/or moving the contents of entries from one location in the entries of the forwarding table to another.

Once the update to the forwarding table has been applied, the packet processor may be directed to use the other entries in the forwarding table instead of the reserved entries, as indicated at 960. For example, as noted above one or more pointer values may be modified, control registers set, or any other indication or technique to provide access to the new entries of the train of entries or group of entries may be performed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
a physical network interface;
a packet processor that processes a live stream of network packets received via the physical network interface according to a forwarding table stored at the packet processor; and a controller, configured to:
  detect an event to update the forwarding table;
  in response to the detection of the event:
    identify a plurality of entries in the forwarding table to move in the forwarding table as a result of applying the update to the forwarding table;
    direct write operations to store copies of the plurality of entries in respective ones of a plurality of reserved entries previously allocated for updates to the forwarding table;
    modify a pointer to the forwarding table to point to the respective reserved entries for processing the live stream of network packets instead of the plurality of entries;
    update the forwarding table, wherein to update the forwarding table, the controller is configured to direct write operations to store copies of the reserved entries in other entries in the forwarding table; and
    modify the pointer to the forwarding table to point to the other entries in the forwarding table for processing the live stream of network packets instead of the respective reserved entries.

2. The networking device of claim 1, wherein the event is a defragmentation event for a chain of entries in the forwarding table including the plurality of entries, wherein to update the forwarding table the controller is further configured to identify a number of contiguous entries in the forwarding table as the other entries in which the copies of the reserved entries are stored.

3. The networking device of claim 1, wherein the forwarding table is a group table comprising a plurality of different groups of entries maintained according to a fixed group size, wherein the event is a route modification event that adds or removes an entry to one of the different groups that includes the plurality of entries, and wherein the other entries are different entries within the same one group.

4. The networking device of claim 1, wherein the detection of the event, the identification of the plurality of entries, the direction of the write operations, the modification of the pointer to point to the reserved entries, the update of the forwarding table, and the modification of the pointer to point to the other entries are performed without interrupting the processing of the live stream of the network packets.

5. A method, comprising:
  determining, by a controller for a packet processor, an update to apply to a forwarding table stored at the packet processor, wherein the packet processor is processing a live stream of network packets;
  identifying, by the controller, a plurality of entries in the forwarding table to be moved in the forwarding table as a result of applying the update to the forwarding table;
  copying, by the controller, the plurality of entries to respective ones of a plurality of reserved entries previously allocated for updating the forwarding table;
  directing, by the controller, the packet processor to use the respective reserved entries for processing the live stream of network packets instead of the plurality of entries in the forwarding table;
  applying, by the controller, the update to the forwarding table, wherein the applying comprises moving the plurality of entries to other entries in the forwarding table; and
  directing, by the controller, the packet processor to use the other entries in the forwarding table for processing the live stream of network packets instead of the respective reserved entries.

6. The method of claim 5, wherein the plurality of entries are stored as part of a chain of entries stored in the forwarding table, wherein the update is an update to defragment the chain of entries by moving the plurality of entries to contiguous entries in the chain of entries, and wherein applying the update to the forwarding table further comprises identifying the other entries as contiguous entries in the chain of entries.

7. The method of claim 6, further comprising:
  prior to identifying the update, allocating the reserved entries to store a number of entries equivalent to a maximum chain length for the chain of entries.

8. The method of claim 6, wherein the forwarding table is one of a plurality of virtual routing tables stored at the packet processor, wherein a different chain of entries is stored as part of another one of the virtual routing tables, wherein different reserved entries are allocated for the different chain of entries, and wherein the determining the update, the identifying the plurality of entries, the copying the plurality of entries, the directing the packet processor to use the respective reserved entries, the applying the update, and the directing the packet processor to use the other entries are performed to apply a different update to one or more entries in the different chain of entries.

9. The method of claim 5, wherein the forwarding table is a group table comprising a plurality of different groups of entries maintained according to a fixed group size, wherein the plurality of entries are included in one of the different groups in the group table, and wherein the other entries are different entries within the same one group.

10. The method of claim 9, further comprising:
  prior to identifying the update, allocating the reserved entries to store a number of entries equivalent to the fixed group size.

11. The method of claim 9, wherein applying the update to the forwarding table further comprises adding another entry to the same one group or removing another entry from the same one group.

12. The method of claim 5,
  wherein the reserved entries are allocated on a different memory than a memory storing the forwarding table;
  wherein directing the packet processor to use the respective reserved entries for processing the live stream of network packets instead of the plurality of entries in the forwarding table comprises enabling a valid bit for a register indicating that the reserved entries in the different memory are to be utilized for processing the live stream of network packets; and
  wherein directing the packet processor to use the other entries in the forwarding table for processing the live stream of network packets instead of the respective reserved entries comprises disabling the valid bit for the register indicating that the other entries in the memory are to be utilized for processing the live stream of network packets.

13. A system, comprising:
  a device configured to perform packet processing, the device comprising;
    a network interface; and
    a packet processing pipeline that processes a live stream of network packets received via the network interface;
  a processor; and
  a memory, wherein the memory stores program instructions that when executed by the processor cause the processor to implement a controller for the device;

wherein the controller is configured to:
   identify an update to a forwarding table implemented as part of the packet processing pipeline, wherein the update includes moving a plurality of entries in the forwarding table; and
   direct application of the update to the forwarding table, wherein the application of the update includes:
     copying the plurality of entries to respective ones of a plurality of reserved entries previously allocated for updating the forwarding table;
     configuring the packet processing pipeline to use the respective reserved entries for processing the live stream of network packets instead of the plurality of entries in the forwarding table;
     moving the plurality of entries to other entries in the forwarding table; and
configuring the packet processing pipeline to use the other entries in the forwarding table for processing the live stream of network packets instead of the respective reserved entries.

14. The system of claim 13, wherein the plurality of entries are stored as part of a chain of entries stored in the forwarding table, wherein the update is an update to defragment the chain of entries by moving the plurality of entries to contiguous entries in the chain of entries, and wherein to direct the application of the update to the forwarding table further, the controller is configured to identify the other entries as contiguous entries in the chain of entries.

15. The system of claim 13, wherein the forwarding table is a group table comprising a plurality of different groups of entries maintained according to a fixed group size, wherein the plurality of entries are included in one of the different groups in the group table, wherein the other entries are different entries within the same one group, and wherein the application of the update further includes adding another entry to the same one group or removing another entry from the same one group.

16. The system of claim 13, wherein the packet processing pipeline comprises a tunnel initiation stage, a multipath stage, and a link aggregation stage, and wherein the group table is a group table for the tunnel initiation stage, the multipath stage, or the link aggregation stage.

17. The system of claim 13, wherein the reserved entries are entries allocated from a same memory component that stores the forwarding table.

18. The system of claim 13, wherein to direct the application of the update, the controller is configured to perform the copying of the plurality of entries, the configuring the packet processing pipeline to use the respective reserved entries, the moving of the plurality of entries, and the configuring the packet processing pipeline to use the other entries in the forwarding table.

19. The system of claim 13,
   wherein to direct the application of the update, the controller is configured to send an instruction to dedicated circuitry at the device to apply the update; and
   wherein the dedicated circuitry is configured to execute microcode to perform the copying of the plurality of entries, the configuring the packet processing pipeline to use the respective reserved entries, the moving of the plurality of entries, and the configuring the packet processing pipeline to use the other entries in the forwarding table in response to the instruction from the controller, wherein the instruction identifies the plurality of entries to move and the other entries to receive copies of the plurality of entries from the reserved entries.

20. The system of claim 13, wherein the device is an application specific integrated circuit (ASIC), a system-on-chip (SoC), or a field-programmable gate array (FPGA).

* * * * *